Dec. 8, 1959  R. J. BERTLING ET AL  2,916,237
ELECTRIC SERVICE BRACKET FOR PIPE MOUNTING
Filed July 5, 1956
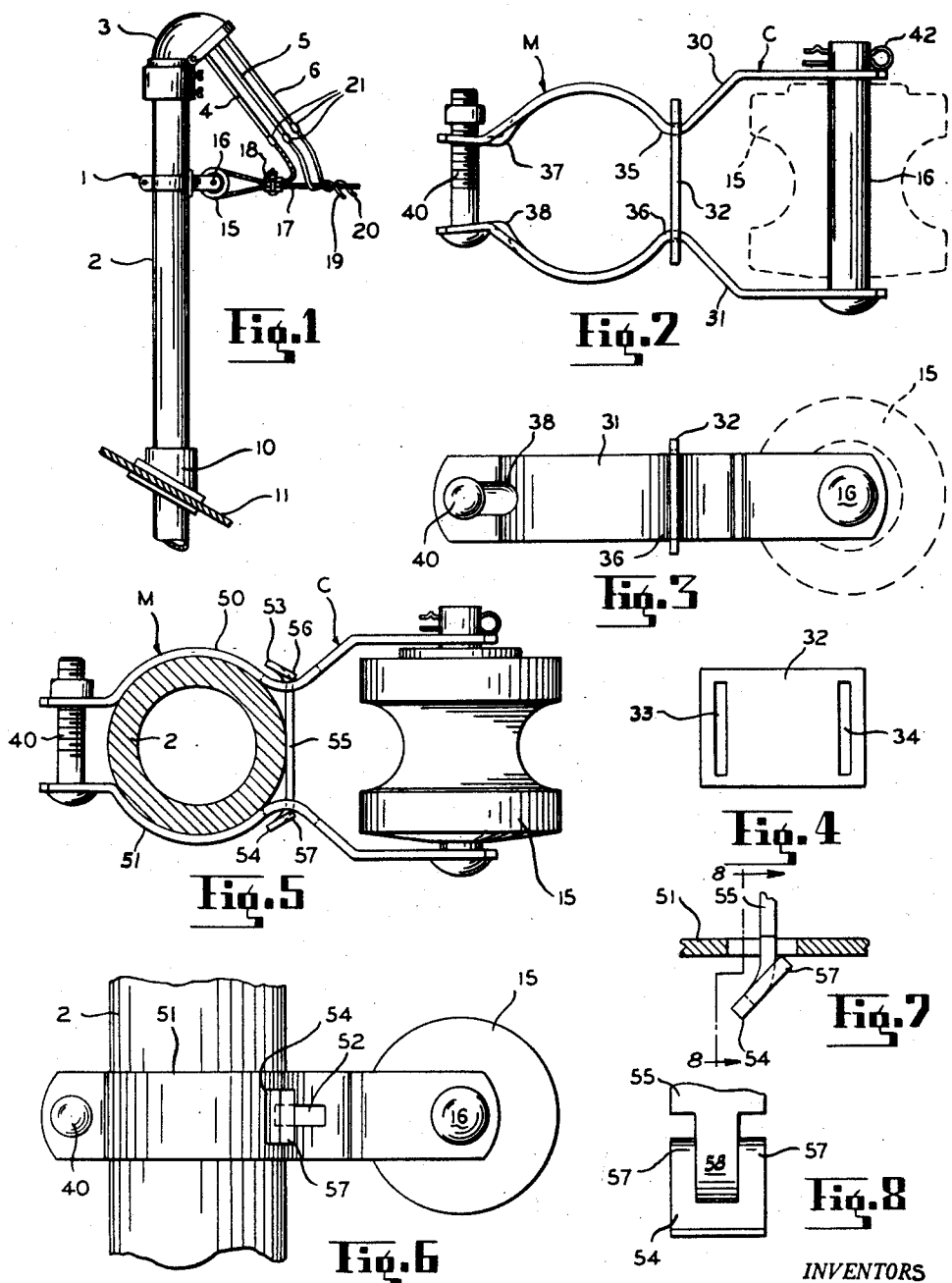
INVENTORS
RONALD J. BERTLING
JOHN V. MAJEWSKI
BY
ATTORNEY

United States Patent Office 2,916,237
Patented Dec. 8, 1959

2,916,237

ELECTRIC SERVICE BRACKET FOR PIPE MOUNTING

Ronald J. Bertling, South Milwaukee, and John V. Majewski, Milwaukee, Wis., assignors to McGraw-Edison Company, a corporation of Delaware Application July 5, 1956, Serial No. 596,107

2 Claims. (Cl. 248—67.7)

The present invention relates to what is commonly known as an insulated bracket or service bracket for mounting on a pipe mast.

In connecting electric service wires from a pole line to a building, electric service companies and electrical codes established by various communities require that the conductors be attached to the building at prescribed minimum elevations above ground level. With the recent advent of one story dwellings, such as bungalows and so-called ranch houses, it has become increasingly difficult to maintain the minimum elevations, and practically impossible to dead-end the conductors on vertical walls high enough to meet the minimum requirement, at least at the point closest to the power line or where it is desired to have the conductors enter the building.

It has become a practice to provide service masts projecting above the roof line of the building to support the conductors above minimum elevation requirements, and to feed lead-end wires or conduit directly through the bore of the tubular mast to the meter box, which is connected at the lower end of the mast, and from there through a service conduit projecting into the building side wall. The present invention contemplates the provision of an insulated bracket used in dead-ending the service drop conductors, and which bracket is mounted directly to the outer surface of the projecting mast member.

It is an object of the present invention to provide a bracket for pipe mounting which is inherently strong and relatively inexpensive to manufacture, and which bracket is capable of receiving a single conductor or a series of conductors wrapped together in what is commonly known as a Triplex installation.

It is another object of the present invention to provide a bracket for pipe mounting having two identically formed side strap members defining a clevis portion at one end and an integral curvate pipe strap portion at the opposite end, which strap members are joined intermediate their ends by means of a transverse spacer member slotted to receive each strap in spaced apart relationship.

It is a further object of the present invention to provide a bracket for pipe mounting which is readily assembled in the field from parts taking a minimum amount of storage space, and which when assembled, provides excellent strength characteristics under both dead-end loads and cantilever loads.

It is still another object of this invention to provide a pipe bracket for supporting a conductor wireholder insulator, and comprising spaced apart straps supported intermediate their ends by a transverse spacer member engaging elongated slots in each of said straps by means of integral latching tongues or ears.

Further objects and advantages relating to details of the present bracket construction will be apparent from consideration of the following description and claims.

Two embodiments of our invention are illustrated on the accompanying drawing in which:

Fig. 1 is an elevational view of a service mast projecting from a dwelling roof and having mounted thereon a bracket in accordance with the present invention.

Fig. 2 is a top view of one embodiment of a bracket made in accordance with this invention.

Fig. 3 is a side elevational view of the said bracket embodiment.

Fig. 4 is an elevation, in detail, of the spacer member of the said bracket embodiment.

Fig. 5 is a top view, partly in section, of another embodiment of this invention.

Fig. 6 is a side elevational view of the bracket of the embodiment of Fig. 5.

Figs. 7 and 8 are fragmentary views illustrating the means of latching the spacer member with the side straps of the embodiment of Figs. 5 and 6, and wherein Fig. 8 is a view taken on lines 8—8 of Fig. 7 and rotated 90° relative thereto.

The preferred embodiment of the present invention is shown in Figs. 1 through 4, wherein the bracket is illustrated in mounting position relative to a service mast in Fig. 1. The bracket, generally designated by the reference numeral 1, is shown in mounting position graspingly engaging a tubular service mast 2, which is usually constructed from a metal pipe or the like, preferably round in cross-section of any suitable length, and which supplies the necessary height for supporting the bracket above minimum elevation requirements. The upper portion of the mast 2 is preferably provided with a slipfitter entrance head 3 adapted to receive the service lead-in conductors 4, 5 and 6, which conductors are threaded through the head of the tubular mast 2 and downwardly relative to Fig. 1 to a conventional meter box (not shown) connected to the lower end of the mast. The mast may be mounted in many ways, either totally exteriorly of the building roof, or as shown, through a roof flashing member 10 mounted directly to the roof 11.

As shown, the present bracket is adapted for dead-end support of so-called Triplex cable. The service drop cable is connected directly to the spool insulator 15 of the bracket which is supported on the bracket by means of a thru pin 16. The direct support is usually provided with the bare neutral-messenger conductor 17, and is further held in place by means of a conventional connector 18. The insulated conductor members 19 and 20 are wrapped around the messenger 17, and are connected respectively to conductor leads 5 and 6 by means of conventional splices 21.

It is to be noted, however, that the present bracket is also intended to operate effectively with individual conductors positioned one above the other and requiring individual bracket members to be positioned on the mast arm for receiving each of the conductors (not shown). In the latter case, it is the general practice to utilize wireholders having thru holes with the axes substantially normal to one another, and relatively elongated with respect to the spool type insulator (not shown).

Directing attention now to Figs. 2, 3 and 4, the bracket 1 is shown in detail, and consists preferably of two substantially identical side strap members 30 and 31, which are positioned in opposed relationship to provide two major portions comprising a clevis portion C and a portion M for graspingly engaging the mast arm 2. Intermediate the portions C and M is positioned a transverse cross strap or spacer member 32. In the present embodiment, the cross strap member is provided with opposed elongated apertures or slots 33 and 34 (see especially Fig. 4) for slidably receiving the straps 30 and 31 respectively. Each side strap member is bent intermediate the portions C and M to provide the inwardly directed curved portions 35 and 36 which are seated in the slots of the cross strap 32. The portion M is preferably provided with inwardly opposed embossments 37 and 38 at the extremity of the respective side strap members 30 and 31. These embossments are desirable from a strength standpoint, but may be omitted if so desired. In addition, each of the side strap members 30 and 31 are apertured to receive the thru bolt and nut assembly 40.

The clevis portion C of the bracket 1 is provided with registering apertures in each of the side strap members for receiving a thru pin 16, which is locked in place by means of a conventional cotter pin 42. Seated on the pin is a spool type insulator 15, shown here in phantom view.

It will be apparent that the preferred embodiment of the bracket provides a relatively inexpensive structure having side strap members which may be formed from the same series of punch press tools and dies to eliminate expensive tooling, and in addition, provides the strength of devices which are relatively heavy and cumbersome in appearance and almost triple in relative dimensions to maintain required strength characteristics.

The spacer member or cross strap 32 eliminates the need of providing a relatively expensive bolt intermediate the ends of the bracket and because of its relative position tangentially relative to the service mast, the strap prevents the side straps from buckling when placed in cantilever and adds rigidity because of its relative width. It is also to be noted that the entire assembly may be fabricated from strip stock rather than requiring cutting and forming of sheet stock. The unit is self adjustable and quickly assembled. It will also be apparent that hardware items are very often difficult to package for shipment because of their bulkiness. The present structure may be shipped broken down in small boxes, if desired.

Another embodiment of the present invention is illustrated in Figs. 5 through 8, and comprises the main features of the first described embodiment, but involves the piercing of the side straps for receiving the intermediate spacer member or cross strap, thus tending to sacrifice strength in both dead-end and cantilever in components of similar dimension. However, the embodiment includes all of the remaining advantages outlined in connection with the first embodiment, where it is desired to provide a bracket not requiring the same strength factors.

In both embodiments like parts are identified by like reference characters.

In the embodiment of Figs. 5–8, it will be noted that the side straps 50 and 51 are also substantially identical and are arranged in opposite position relative to one another to provide the clevis portion C and the mast arm grasping portion M. In the present embodiment, however, the straps are provided with elongated slots preferably in the direction of their respective longitudinal axes. The slots 52 are arranged to loosely receive laterally extending ears or tongue portions 53 and 54 extending from opposite sides of the cross strap or plate member 55. Thus, when assembling the bracket before the thru pin 16 and the machine bolt assembly 40 are placed in position, each side strap is arranged substantially normal to the cross strap 55 to permit the respective slots 52 to receive the integral ears 53 and 54. The ears are inserted in the respective slots and snapped in place by means of the respective lanced out detent portions 56 and 57 which engage the sides of the respective straps when the strap is rotated substantially 90° to operating position shown in Figs. 5 and 6. The detent portions define an intermediate bar 58 of reduced width (see Fig. 8) adapted to engage the end of the respective slot nearest the service mast as shown in Figs. 5 and 6.

Thus, a bracket operating in a substantially identical manner to the first embodiment described in connection with Figs. 1–4 is also provided by the present embodiment to perform substantially the same service.

It will be apparent that in both embodiments the transversely arranged cross straps 32 and 55 tangentially engage the mast arm member to provide a rigid construction when the assembly has been tightened in place by means of a machine screw assembly 40 at the opposite side of the service mast 2.

Having thus described our invention, what we claim as new and desire to secure by Letters Patent is:

1. A bracket adapted for mounting on a mast member and comprising opposed elongated side straps jointly defining a clevis portion and a mast engaging portion therebetween, each of said side straps defining an elongated longitudinal slot intermediate said clevis portion and said mast engaging portion, fastening means for securing said mast engaging portion in embracing relationship with said mast member, means for supporting an insulator between said opposed side straps and within said clevis portion, and a relatively straight cross strap having a center portion and opposed laterally extending latching elements at each end thereof, each end being arranged to be slidably received by respective longitudinal slots in said side straps and further being arranged to be positioned substantially normal to said slots for engagement with said side straps, the center portion of said cross strap mechanically engaging said mast member to prevent relative lateral movement therebetween.

2. A bracket adapted for mounting on a mast member and comprising a pair of opposed elongated side straps each being formed with a first relatively straight portion having an aperture therein, a curvilinear second portion, a third portion contiguous with said second portion and sharply divergent therefrom to conjointly define a sharp bend, and a relatively straight fourth portion formed with an aperture, each of said side straps being disposed to bend oppositely relative to one another to have said respective fourth portions jointly define a clevis portion and said respective curvilinear second portions define a mast engaging portion therebetween, fastening means disposed in said apertures of said first portions for securing said mast engaging portion in embracing relationship with said mast member, means disposed in said apertures of said fourth portion for supporting an insulator between said opposed side straps and within said clevis portion, and a cross strap positioned at said sharp bend in each of said side straps disposed transversely relative to said side straps and having means for slidably receiving each of said side straps, said cross strap being adapted to engage said mast member on securement therewith of said side strap mast arm engaging portions, said sharp bend being adapted to prevent longitudinal movement of said cross strap relative to said side straps.

References Cited in the file of this patent

UNITED STATES PATENTS

| | | |
|---|---|---|
| 1,376,284 | Kohn | Apr. 26, 1921 |
| 1,806,170 | Law | May 19, 1931 |
| 1,857,668 | Sund | May 10, 1932 |
| 2,470,814 | Hain | May 24, 1949 |
| 2,610,816 | Vote | Sept. 16, 1952 |
| 2,746,701 | Carpenter | May 22, 1956 |

FOREIGN PATENTS

| | | |
|---|---|---|
| 788,262 | France | July 22, 1935 |